Patented Aug. 26, 1941

2,253,934

UNITED STATES PATENT OFFICE 2,253,934

MANUFACTURE OF POLYMERIZABLE HYDROCARBONS

Morton Harris, New Haven, Conn., assignor to Monsanto Chemical Company, St. Louis, Mo., a corporation of Delaware No Drawing. Application June 17, 1938, Serial No. 214,305

17 Claims. (Cl. 260—669)

This invention relates to the manufacture of styrene and polymerizable hydrocarbons of the styrene type. The present application is a continuation-in-part of my co-pending application, Serial No. 698,687, filed on November 18, 1933, now abandoned.

The principal object of this invention is the provision of a process for producing polymerizable hydrocarbons from cheap and readily obtained raw materials. A further object is the provision of a process for the production of styrene from cheap raw materials and in good yields.

According to Ferko (Berichte der deutschen chem. Ges., vol. 20 (1887), page 660) styrene (styrol) may be prepared by passing a mixture of ethylene and benzene through a tube heated to redness. The yields of styrene, however, are relatively meager, the principal product being diphenyl. From about 1318 grams Ferko obtained 17 grams of styrene and 300 grams of diphenyl. In other proposed processes use is made of relatively more expensive raw materials such as ethylbenzene, chloroethylbenzene, cinnamic acid, and related compounds.

I have now discovered that relatively high yields of styrene and related polymerizable hydrocarbons may be prepared by the pyrolysis of mixtures of aromatic hydrocarbons or analogues thereof and aliphatic hydrocarbons when the pyrolysis is effected by exposure of the hydrocarbon mixture to a highly heated liquid material, inert with respect to the hydrocarbons employed. Such exposure is best accomplished by passing or bubbling a stream of the vaporized or gaseous hydrocarbons through inert liquids heated to a suitable pyrolysis temperature. The liquids employed are preferably the metals having relatively low melting points, although in many cases I may employ alloys of such metals or even mixtures of salts. As examples of suitable metals, I may employ lead, tin, aluminum or alloys thereof. Suitable salts may comprise mixtures of sodium chloride and calcium chloride, with or without other salt additions, as described in the patent to Thomas E. Warren, No. 1,891,514.

By employing a heating medium of a fluid type, such as above described, I am enabled to obtain considerably higher yields of the desired products without the simultaneous production of large amounts of diphenyl and other by-products. Furthermore, in using such a method of pyrolysis I am enabled to avoid to a great extent difficulties arising from the formation of carbon which are so troublesome in tube cracking.

While I may employ either a saturated aliphatic hydrocarbon or an unsaturated aliphatic hydrocarbon in my preferred process, somewhat better yields are obtained when using saturated hydrocarbons or even a mixture of saturated and unsaturated aliphatic hydrocarbons. Such aliphatic hydrocarbons are to be employed in admixture with an aromatic hydrocarbon, preferably benzene or derivatives thereof. Considerably better results are obtained when the aromatic hydrocarbon employed is monocyclic (single ring) such as benzene or a derivative such as toluene or xylene.

Employing, as I do, a mixture rather than a pure hydrocarbon, the products which I obtain, while including styrene as a constituent thereof, are characterized by a rather wide boiling range. Hence, for many purposes where polymerizable products are desired, the process of the present invention has many advantages not hitherto obtained by known processes.

As an example of one way by which my invention may be carried out, the following is cited.

I make a mixture of 50 parts by volume of benzene (commercial benzol) and 50 parts by volume of a low-boiling paraffin hydrocarbon, such, for example, as solvent "B" naphtha. Naphtha of this grade has a boiling range of from 75° to 115° C., and contains mainly saturated aliphatic hydrocarbons of 6 to 9 carbon atoms in the molecule. A small proportion, about 5%, of the naphtha consisted of unsaturated hydrocarbons.

I now subject this hydrocarbon mixture to heat by bubbling it through a bath of molten lead. I employ for this purpose an apparatus of the type described in U. S. Patent 1,894,283, to Thomas J. Scott. Such an apparatus consists of two lead baths, one being termed the preheater and the other the converter, the hydrocarbon vapors being first passed through the preheater where the temperature thereof is raised to an intermediate point, say, 600° C., and then into the converter, where the temperature is raised to 800° or 850° C. In many cases the preheater may be dispensed with. In any case the heated vapors leaving the converter are cooled and condensed, and the liquid condensate collected.

The condensate is now distilled at atmospheric pressure, the fraction boiling between 100° and 200° C. being collected. This constitutes the polymerizable product desired. If it is desired to isolate styrene in pure form, it is merely necessary to fractionate the product carefully at about the boiling temperature of styrene (146° C.).

Operating in the above manner, I have obtained a yield of 9.5% of polymerizable product as contained in the 100° to 200° C. fraction of the condensate collected, when the converter temperature was maintained at 800° C. With a converter temperature of 850° C., a yield of 10.9% of such fraction was obtained. I have found that, in general, it is desirable to pass the vapor through the converter as rapidly as possible consistent with a thorough heating of the vapors to the reacting temperature. Furthermore, to inhibit side reactions and polymerization of the polymerizable products directly after their formation, it is desirable to shock cool or quench the vapors as they issue from the pyrolysis chamber by water, cold benzene or solvent naphtha, or other liquid. Benzene or solvent naphtha is preferred for this purpose since the resulting mixture, after separation of polymerizable hydrocarbons therefrom, can be used directly for further recycling.

The proportions of aromatic to aliphatic hydrocarbons used may vary over a wide range. In general a higher yield of polymerizable products is obtained when the amount of aromatic hydrocarbon is equal to, or exceeds, the amount of aliphatic hydrocarbon.

The optimum temperature for the production of polymerizable products is in the neighborhood of 850° C., although some latitude is also permissible here and temperatures as high as 900° C. produce polymerizable products. I have operated my process at temperatures as low as 750° C., but I prefer temperatures above this point. In general it may be said that any temperature effective to bring about pyrolysis of both compounds will be satisfactory, provided that the temperature is not sufficiently high to cause destructive pyrolysis (complete formation of carbon and hydrogen).

The aromatic hydrocarbons which I employ are preferably benzene, toluene or xylene, either in pure form or in admixture with each other. The aliphatic hydrocarbons employed are either saturated or unsaturated, preference being given to the former because of the greater yield of the desired product obtained thereby. Suitable hydrocarbons are those containing from approximately two to ten carbon atoms such as ethane, ethylene, hexane, octane, pentane, or isomers or homologues of these bodies, or commercial petroleum naphthas or similar fractions of petroleum. In general, suitable aliphatic hydrocarbons contain from two to nine or ten carbon atoms in the molecule.

My process is particularly adapted to the pyrolysis of mixtures of aliphatic and monocyclic aromatic hydrocarbons. Such starting materials possess the merit of being cheap and readily available. In the process the polymerizable material is evidently formed in two reactions, the first of which consists in the condensation or combination of the aliphatic hydrocarbon with the aromatic hydrocarbon to form an alkyl-substituted aromatic hydrocarbon (for example, a phenyl alkane) which in the next reaction is converted by dehydrogenation to an alkylene-substituted aromatic hydrocarbon (for example, a phenyl alkene). Within the scope of my invention I may therefore replace wholly or in part this mixture of aliphatic and monocyclic aromatic hydrocarbons by an intermediate alkyl-substituted benzene in which the alkyl groups contain at least two carbon atoms per molecule. For example, ethylbenzene, propylbenzene, isopropylbenzene, butylbenzene, hexylbenzene, octylbenzene, etc. may be substituted for the mixture of aliphatic and aromatic hydrocarbons. Ethylbenzene has been heretofore pyrolyzed in heated tubes and in tube cracking units but the yields have been low. Ferko, for example, reported a yield of only 10 grams of styrene by pyrolysis of 500 grams of ethylbenzene (Berichte der deutschen chem. Ges., vol. 20 (1887), p. 663). I have found that the pyrolysis in molten metal or salt baths, according to the method of the present invention, not only provides good yields of styrene from ethylbenzene but that the pyrolysis is attended without any difficulties from carbon formation and without the production of excessive proportions of undesirable diphenyl and dicyclic hydrocarbons, hence after separation of styrene from the pyrolyzed material the residual hydrocarbons can be recycled. Furthermore, the process of the invention offers a convenient method of controlling the pyrolysis temperature and this contributes in a great measure to obviating some of the difficulties engendered by carbon formation which are so pronounced in tube pyrolysis processes.

When using alkyl-substituted aromatic hydrocarbons such as ethylbenzene in my process the temperature to be employed will vary according to the specific material employed, the rate of flow of the material and such factors. In general, temperatures for the pyrolysis of the alkyl-substituted aromatic hydrocarbon pyrolysis for the production of styrene or its homologues will be somewhat lower than those used for identical rates of flow of a mixture of aliphatic and aromatic hydrocarbons and are within the optimum range of approximately 550° to 750° C.

In practicing my process, addition to the mixture undergoing pyrolysis of a small proportion of sulfur or a volatile sulfur compound such as carbon disulfide, as in tube pyrolysis, may be made to reduce the proportion of destructive pyrolysis products and undesired by-products. However, I prefer to pyrolyze the mixtures without these additions since difficulties of carbon formation can be obviated in my process by careful pyrolysis temperature adjustment, which is easily made and which, when properly made, avoids destructive pyrolysis of the material being pyrolyzed. Any small quantities of carbon which form during the pyrolysis rise to the surface of the molten metal and can be removed periodically by skimming.

By the term "polymerizable hydrocarbons" I refer to those compounds boiling within the range of 100° to 200° C., which may be polymerized by the action of a small amount of sulfuric acid, or similar polymerizing agent, to form a resinous or vitreous solid or semi-solid body. The polymerizable hydrocarbons consist of styrene (vinyl benzene), propenylbenzene, butenylbenzene and the higher phenyl alkenes or alkene benzenes.

Having now described one embodiment of my invention, it will be apparent that it is not so limited but is susceptible to various changes and modifications without departing from the spirit of the invention, and I desire that only such limitations shall be placed thereupon as may be imposed by the prior art or as are specifically set forth in the appended claims.

What I claim is:

1. The process comprising contacting a hydrocarbon material selected from the group consisting of (1) alkylated monocyclic aromatic hydrocarbons having at least two carbon atoms in the alkyl group and (2) mixtures of monocyclic aromatic hydrocarbons and aliphatic hydrocarbons having from two to ten carbon atoms in the molecule which mixture reacts in the pyrolytic step to form as intermediate products alkylated monocyclic aromatic hydrocarbons having at least two carbon atoms in the alkyl group, with an inert molten metal-containing heating medium at a temperature effective to bring about pyrolysis thereof, and then separating polymerizable hydrocarbons from the pyrolyzed mixture.

2. The process comprising bubbling a mixture of a single-ring aromatic hydrocarbon and an aliphatic hydrocarbon through an inert molten metal-containing heating medium at a temperature effective to bring about pyrolysis thereof, and then separating polymerizable hydrocarbons from the pyrolyzed mixture.

3. The process comprising contacting a mixture of a single-ring aromatic hydrocarbon and a saturated aliphatic hydrocarbon with an inert molten metal heating medium at a temperature effective to bring about pyrolysis thereof, and then separating polymerizable hydrocarbons from the pyrolyzed mixture.

4. The process comprising contacting a mixture of a single-ring aromatic hydrocarbon and a saturated aliphatic hydrocarbon having from two to ten carbon atoms in the molecule with an inert molten metal heating medium at a temperature effective to bring about pyrolysis thereof, and then separating polymerizable hydrocarbons from the pyrolyzed mixture.

5. The process comprising contacting a mixture of single-ring aromatic hydrocarbons and a mixture of aliphatic hydrocarbons ranging from six to nine carbon atoms in the molecule with an inert molten metal-containing heating medium at a temperature effective to bring about pyrolysis but below that temperature at which substantial destructive pyrolysis occurs, and then separating polymerizable hydrocarbons from the pyrolysis mixture.

6. The process comprising contacting a vaporized mixture of benzene and ethylene with an inert molten metal-containing heating medium at a temperature between 750° C. and 850° C., and then separating styrene from the resulting product.

7. The method of forming polymerizable hydrocarbons comprising contacting a vaporous mixture of benzene and a normally gaseous hydrocarbon fraction consisting predominately of saturated aliphatic hydrocarbons with an inert molten metal-containing heating medium at a temperature of between 750° and 850° C.

8. The process comprising contacting an alkylated monocyclic aromatic hydrocarbon having at least two carbon atoms in the alkyl group with an inert molten metal-containing heating medium at a temperature effective to bring about pyrolysis thereof, and then separating polymerizable hydrocarbons from the pyrolyzed mixture.

9. The process of forming polymerizable hydrocarbons comprising contacting a mixture of single-ring aromatic hydrocarbons and aliphatic hydrocarbons having from six to nine carbon atoms in the molecule with an inert molten metal heating medium at a temperature between 750° C. and 850° C.

10. The process of forming polymerizable hydrocarbons comprising contacting a mixture of a single-ring aromatic hydrocarbon and an aliphatic hydrocarbon mixture having from six to nine carbon atoms in the molecule, with an inert molten metal-containing heating medium at a temperature of between 750° C. and 850° C.

11. The process of forming polymerizable hydrocarbon mixtures containing styrene which comprises contacting a vaporized mixture of benzene together with aliphatic hydrocarbons having from six to nine carbon atoms in the molecule, with an inert molten metal heating medium at a temperature above 750° C. and not appreciably higher than 850° C.

12. The process of forming polymerizable hydrocarbon mixtures containing styrene from benzene and solvent naphtha which comprises contacting a vaporized and preheated mixture of benzene together with the aliphatic hydrocarbons occurring in the solvent naphtha with an inert molten metal heating medium at a temperature above 750° C. and not appreciably higher than 850° C.

13. The process of forming polymerizable hydrocarbons comprising contacting a mixture of a single-ring aromatic hydrocarbon and an aliphatic hydrocarbon mixture having from six to nine carbon atoms in the molecule with an inert molten metal-containing heating medium at a temperature between 750° C. and 850° C. and separating from the products thereof a polymerizable hydrocarbon.

14. The process of forming polymerizable hydrocarbons comprising contacting a mixture of a single-ring aromatic hydrocarbon and an aliphatic hydrocarbon mixture having from six to nine carbon atoms in the molecule, with an inert molten metal-containing heating medium at a temperature between 750° C. and 850° C., and separating from the products thereof, by distillation, a polymerizable hydrocarbon fraction boiling between 100° C. and 200° C.

15. The process of forming polymerizable hydrocarbons comprising contacting an alkylated monocyclic aromatic hydrocarbon having at least two carbon atoms in the alkyl group with an inert molten metal heating medium at a temperature between 550° and 750° C.

16. The process of forming polymerizable hydrocarbons comprising contacting ethylbenzene with an inert molten metal-containing heating medium at a temperature between 550° and 750° C.

17. The process comprising contacting a mixture of a single-ring aromatic hydrocarbon and an unsaturated aliphatic hydrocarbon with an inert molten metal heating medium at a temperature effective to bring about pyrolysis thereof, and then separating polymerizable hydrocarbons from the pyrolyzed mixture.

MORTON HARRIS.